United States Patent [19]

Klee et al.

[11] Patent Number: 4,461,603
[45] Date of Patent: Jul. 24, 1984

[54] DRILLING FIXTURE

[75] Inventors: George Klee, Cincinnati; George R. De Noma, Madeira; Stephen L. Collier; Rodney J. Newman, both of Cincinnati, all of Ohio

[73] Assignee: Cincinnati Tool, Division of Warren Tool Corporation, Cincinnati, Ohio

[21] Appl. No.: 359,821

[22] Filed: Mar. 19, 1982

[51] Int. Cl.³ .................................................. B23B 47/28
[52] U.S. Cl. .............................. 408/115 R; 408/72 R
[58] Field of Search ................. 408/115 R, 72 R, 104, 408/103, 107, 75; 269/41, 902, 246, 87.3, 294

[56] References Cited

U.S. PATENT DOCUMENTS

| | | | |
|---|---|---|---|
| 550,767 | 12/1895 | Thielscher | 408/97 |
| 907,735 | 12/1908 | Cain | 408/115 X |
| 1,329,970 | 2/1920 | Hauser | 408/90 |
| 2,208,480 | 7/1940 | Smith | 408/97 |
| 2,232,374 | 2/1941 | Drews | 408/115 |
| 2,645,951 | 7/1953 | Sponsler | 408/103 |
| 3,138,975 | 6/1964 | Saye | 408/97 |
| 3,589,825 | 6/1971 | Wojcik | 408/72 |
| 3,775,020 | 11/1973 | Stoutenberg | 408/115 R |
| 3,985,462 | 10/1976 | Didato | 408/115 R X |
| 4,005,945 | 2/1977 | Gutman | 408/97 X |
| 4,306,823 | 12/1981 | Nashlund | 408/115 R X |

FOREIGN PATENT DOCUMENTS

| | | | |
|---|---|---|---|
| 942485 | 11/1955 | Fed. Rep. of Germany | 408/115 |
| 11250 | of 1896 | United Kingdom | 269/246 |
| 3221 | of 1910 | United Kingdom | 408/115 |

Primary Examiner—William R. Briggs
Assistant Examiner—Lawrence Meier
Attorney, Agent, or Firm—Wood, Herron & Evans

[57] ABSTRACT

A drilling fixture for drilling either cylindrical or flat workpieces on or off center is disclosed. The fixture includes a base having a V-shaped groove for receiving larger cylindrical workpieces, a pair of smaller V-shaped openings in the side walls of the base for receiving smaller cylindrical workpieces, a cover attached to the base, and a rotatable, indexable drill bushing mounted to the cover. The larger and smaller V-shaped grooves intersect at a common workpiece center-line drilling point. Thumbscrews are provided to clamp the workpieces in the grooves. The drill bushing includes a series of different size drill guide holes spaced about the circumference of the bushing on a common radius for receiving predetermined drill bit diameters to guide the drill bits along their longitudinal axes during a drilling operation. The bushing has intersecting planar side faces and vertical edges which engage a raised indexing and locking block on the cover for locating and positively locking the bushing in place for the drilling operation. V-shaped stepped inserts can be mounted in the larger V-shaped groove in the base to allow for drilling of common sizes of channel steel, angle iron, and similar structural shapes.

5 Claims, 6 Drawing Figures

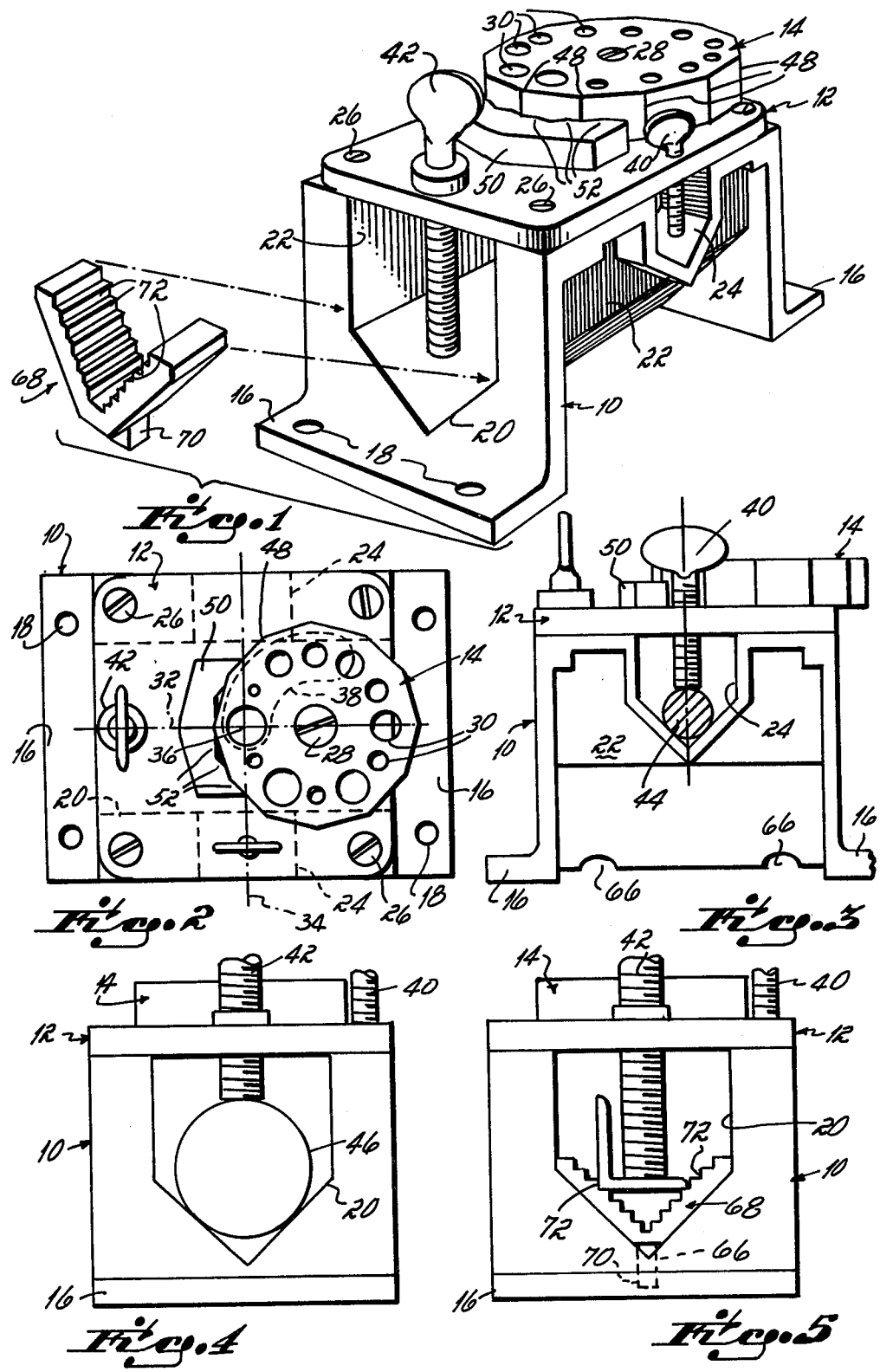

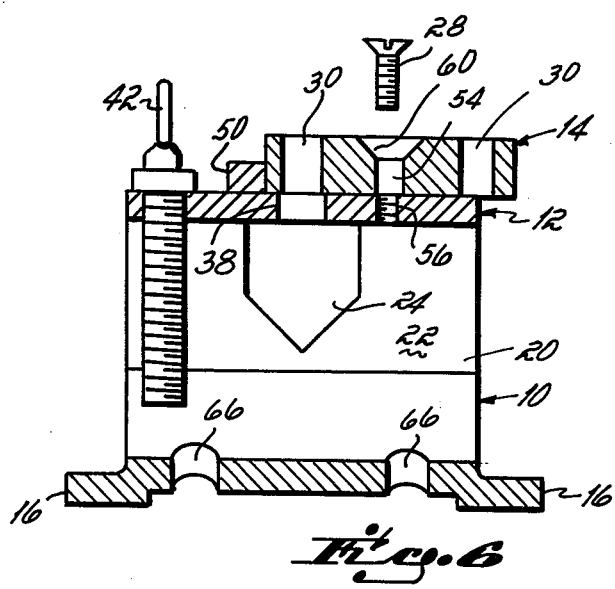

DRILLING FIXTURE

BACKGROUND OF THE INVENTION

This invention relates to a drilling fixture and, more particularly, to a drilling fixture for the accurate positioning of drill bits and control of the direction and course of the drill bits during drilling of cylindrical-shaped workpieces either on or off center.

Prior workers in the art have addressed the problem of drilling cylindrical-shaped workpieces. As is known in the art, the problems with drilling cylindrical-shaped workpieces reside in locating the drill precisely at the spot to be drilled and then maintaining the direction and course of the drill during the drilling operation. In drilling cylindrical-shaped workpieces, the drill tends to wander on the cylindrical surface when drilling is started; and, once drilling has begun, it is difficult to keep the drill bit in proper alignment which results in sticking of the drill in the drill hole and possible breaking of the drill. Representative of prior art drill fixtures for the drilling of cylindrical workpieces are U.S. Pat. Nos. 550,767, 907,735, 1,329,970, 2,208,480, 3,138,975, and 4,005,945. These patents all involve some sort of fixture for holding the workpiece in place as well as some form of drill guide. The problem with the prior art, however, is that the drill fixtures typically are made up of relatively complicated mechanisms for holding the workpiece and centering the drill and/or lack both an efficient design and versatility. These prior fixtures thus lack compactness and economies of manufacture as well as the versatility to drill different size and shape workpieces with drill bits of various diameters either on or off center.

SUMMARY OF THE INVENTION

The present invention overcomes the problems of the prior art by providing a drill fixture which assists in the accurate positioning of drill bits of varying diameters and controls the direction and course of the drill during a drilling operation for drilling of both round and flat stock either on or off center. The drilling fixture of the present invention locates the drill bit precisely with the spot to be drilled, maintains the drill in that location without wandering during the drilling operation whether drilling a curved or flat surface either on or off center, and maintains the alignment of the drill throughout the drilling operation.

In a presently preferred form of the invention, the drilling fixture includes a base having a larger V-shaped groove therethrough for receiving a larger cylindrical workpieces and a pair of smaller V-shaped openings or grooves in the vertical side walls of the base for receiving smaller cylindrical workpieces. The two V-shaped grooves intersect at right angles, and their longitudinal axes intersect at a common centerline drilling point. Thumbscrews are provided for clamping the workpieces in the grooves. A rotatable, indexable drill bushing is mounted to a cover attached to the base. This drill bushing includes a series of different size drill guide holes therethrough circumferentially spaced about the periphery of the bushing on a common radius. The drill guide holes are adapted to receive predetermined drill bit diameters to allow rotation of the drill bits in the holes while guiding the drill bits along their longitudinal axes during a drilling operation. The bushing has a number of intersecting planar side faces which meet to form vertical edges. The cover includes an indexing and locking block having ratchet-type teeth which engage the vertical edges of the drill bushing to index the bushing. To drill on the centerline of the workpiece, when the bushing is properly indexed, the center of the desired size drill guide hole is positioned in line with the point of intersection of the longitudinal axes of the V-shaped groove and the V-shaped openings in the side wall of the base, the center of the drill guide hole and the point of intersection of the two groove axes defining a drilling axis along which the longitudinal axis of the drill bit travels during the drilling operation. The bushing is positively locked in its chosen position by tightening a mounting screw passing through the bushing to maintain the bushing in its fixed position throughout the drilling operation. The drill guide hole in the drill bushing thus locates the center of the drill bit precisely in line with the point of intersection of the two axes of the V-shaped grooves and openings and maintains the drill in this position throughout the drilling operation. The cover further includes a cut out section which extends from a point above the point of intersection of the groove axes to one of the interior side walls of the larger V-shaped groove over a 90° arc. This permits drilling additionally off of center, i.e., at positions from the center of the workpiece to its side wall or edge.

The drilling fixture may be adapted for the drilling of various common sizes of rectangular bar stock, channel steel, angle iron, and similar structural shapes by mounting V-shaped stepped inserts in openings in the base in the V-shaped groove. These inserts serve to fix the workpiece in the groove during the drilling operation.

The presently preferred embodiment of the invention is extremely versatile in that it permits the drilling either on or off center at predetermined locations of round stock or pipe up to 2 inches in diameter, rectangular stock up to 2⅜ inch wide by 1¼ inch high, square stock up to 1½ inch on bias and channel steel, angle iron, and similar structural shapes with holes from ⅛ inch to ½ inch in diameter by 1/32 inch increments, with the exception of 15/32 inch. The drill bushing is dodecagonal in shape (12-sided) allowing it to be indexed on 15° increments. The drilling fixture of the present invention can be used in conjunction with a drill press or the fixture can be mounted to a workbench and a hand drill used.

Among the many advantages of the present invention are its extreme versatility while maintaining simplicity, compactness, durability and attractiveness while being less expensive to manufacture than prior art fixtures.

DESCRIPTION OF THE DRAWINGS

FIG. 1 is a perspective view of a presently preferred embodiment of the drilling fixture of the present invention.

FIG. 2 is a plan view of the drill fixture shown in FIG. 1.

FIG. 3 is a side elevational view of the drill fixture shown in FIG. 1 showing a piece of cylindrical stock clamped in place in the smaller V-groove opening.

FIG. 4 is an end elevational view of the drill fixture shown in FIG. 1 showing a tubular workpiece clamped in place in the larger V-shaped groove.

FIG. 5 is a view similar to that of FIG. 4 showing another embodiment of the drilling fixture.

FIG. 6 is a partially exploded cross-sectional view of the drilling fixture shown in FIG. 1.

DETAILED DESCRIPTION OF THE INVENTION

Referring now to the drawings and particularly to FIG. 1, the drilling fixture of the present invention comprises a base 10, a cover 12 and a rotatable, indexable drill bushing 14 mounted on the cover. The base 10, which may be formed of a suitable durable material such as die cast aluminum, includes a pair of legs 16 having holes 18 therethrough which permit the drill fixture to be mounted to a drill press, workbench or other work surface by the insertion of machine screws, for example, therethrough. A V-shaped groove 20 extends through the base 10 from end to end. The base further includes a pair of side walls 22 having V-shaped openings 24 therein. As may be seen from FIG. 1, the V-shaped openings 24 are of a size smaller than the size of the V-shaped groove 20 to receive smaller diameter round stock or pipe. That is, in the presently preferred form of the invention, the inside distance between the side walls of the groove 20 is 2⅛ inch giving the V-shaped groove 20 a maximum capacity of two-inch diameter round stock or pipe while the V-shaped openings 24 in the side walls 22 are 1⅛ inch in maximum dimension giving these openings a capacity of up to one-inch round stock or pipe.

The cover 12 is secured to the base 10 by means of screws 26. The drill bushing 14 is mounted to the cover by means of a screw 28 passing through the bushing 14 and threaded into a hole in the cover 12 as will be described later in detail. The bushing 14 contains a series of different size drill guide holes 30 spaced radially outwardly from the center of the bushing and circumferentially spaced one from another on a common radius. In the embodiment shown in the drawings, the indexable drill bushing has 12 drill sizes for drilling holes from ⅛ inch to ½ inch in diameter by 1/32 inch increments, with the exception of 15/32 inch. The drill guide holes 30 pass through the bushing so as to receive predetermined drill bit diameters therethrough to allow rotation of the drill bits in their corresponding guide holes while guiding the drill bits along their longitudinal axis during a drilling operation.

Referring in particular to FIG. 2, it may be seen that the longitudinal axis 32 of the V-shaped groove 20 and the longitudinal axis 34 of the V-shaped openings 24 in the side walls 22 of the base 10 intersect one another at right angles at a point 36. Since the centers of the drill guide holes 30 lie on a circle of common radius the circumference of which lies directly above the point of intersection 36 of the longitudinal axes 32 and 34 of the groove 20 and openings 24, respectively, the point of intersection 36, as shown in FIG. 2, is always in vertical alignment with the center of the overlying drill guide hole 30 regardless of which hole 30 is placed there. Thus, when the drill bushing is rotated to position a selected drill hole 30 over the workpiece, the center of that hole lies in vertical alignment with the point 36 of intersecting axes 32 and 34. Thus, when a drill bit is extended through that drill guide hole, the bit is positioned for drilling at the centerline of the workpiece regardless of whether the workpiece is located in the groove 20 or extends through the openings 24.

The cover 12 preferably includes a cut out arcuate section 38 (FIG. 2) which extends from a point permitting drilling through the largest drill guide hole 30 at the intersection point 36 to a position permitting drilling 90° therefrom without rotating the bushing 14. This permits drilling either on the center of the workpiece (at 36) or drilling off center all of the way to the side or edge of the workpiece. In either event, however, the drill bushing 14 is precisely indexed and positively locked by tightening of the mounting screw 28 as will be described.

From the foregoing description, it may be seen the indexable drill bushing 14 maintains the drill bits in vertical alignment and either on or off the centerline of the workpiece, as desired, throughout the drilling operation. The drill bushing thus prevents wandering of the drill when drilling is first begun and prevents the drill bit from moving away from vertical alignment during drilling which would otherwise cause sticking and possibly breaking of the drill in the drill hole. The drill guide bushing 14 locates the drill precisely with respect to the spot to be drilled, maintains the drill in its precise location during drilling whether drilling a curved or flat surface, and maintains the drill in a vertical position throughout the drilling operation through both sides of the round stock or pipe.

A thumbscrew 40 is threaded through a hole in the cover 12 and extends into the V-shaped groove 24 to firmly clamp the cylindrically-shaped workpiece in position in the groove for drilling as shown at 44 in FIG. 3. A second thumbscrew 42 is likewise threaded through a hole in the cover 12 and extends into the V-shaped groove 20 to clamp a larger workpiece therein such as tube stock, as shown at 46 in FIG. 4. However, either of the two grooves can accommodate either tubular or solid round stock. The particular groove used is a matter of choice depending on the diameter of the workpiece.

The indexable drill bushing 14 has a number of planar faces about its perimeter which intersect to form vertical edges 48. The cover 10 includes a raised indexing and locking block 50 which extends from the top surface of the cover. The block 50 has a plurality of ratchet-type teeth 52 that engage edges 48 of drill bushing 14 allowing it to be indexed to locate a chosen drill guide hole 30 in position above point 36 or at an off-center position. In the presently preferred form of the invention, the drill bushing is dodecagonal, i.e., twelve sided, permitting it to be indexed on 15° increments. As shown in FIG. 2, in one position three of the edges 48 engage the teeth 52 of the block 50. When the bushing is turned 15 degrees, two of the teeth 52 then engage the edges 48. When the bushing is turned again 15 degrees, three teeth 52 again engage the edges 48 of the bushing 14.

The block 50 also provides a positive lock for the bushing once it is indexed to place a chosen drill hole 30 in position. Referring to FIG. 6, this locking is accomplished as follows. When the drill bushing 14 rests on the cover 12 in a properly indexed position the edges 48 of the bushing 14 engage the teeth 52 of the block 50. The mounting screw 28 passes through a hole 54 at the center of the bushing and is threaded into a hole 56 in the cover. The hole 54 in the drill bushing 14 is countersunk so as to form a frustoconical surface 60 for receiving the tapered head of the mounting screw 28. When the mounting screw 28 is inserted through the hole 54 and into the threaded hole 56 in the cover 10 and the screw 28 is tightened down, the tapered surface of the screw head engages the frustoconical surface 60 in the drill bushing 14 centering and locking the bushing against the indexing block. This taper fit thus provides a positive lock for the drill bushing during the drilling operation. The bushing may be released and rotated merely by removing the screw 28 or by backing out the screw 28 a sufficient distance to permit the bushing 14 to be lifted upwardly to clear the block 50.

The guide holes 30 in the drill bushing 14 are sized to receive predetermined drill bit diameters so as to allow rotation of the corresponding drill bits in the holes which guide them during the drilling operation. The guide holes are oversized with respect to their corresponding drill bits by about 1 to 2 thousandths of an inch. Since the bits actually rotate in the guide holes and engage the walls thereof, it is desirable that the bushing be hardened to prevent undue wear. To this end, a suitable material of construction for the bushing is a copper-steel powder metal alloy which is pressed and sintered and carbonitrided to a hardness of 70-74 Rc.

Although the drilling fixture described above is directed to drilling cylindrical-shaped workpieces, in a further embodiment of the invention, the drilling fixture may be adapted to receive for drilling common sizes of rectangular bar stock, angle iron, and channel steel. To do so, the groove 20 in the base 10 is provided at each end with holes 66 which receive V-shaped stepped inserts 68 each insert having a peg 70 which fits down into the hole 66. These inserts are mounted at either end of the V-shaped groove 20. The stepped surfaces 72 of the inserts 68 permit the non-cylindrical stock to be clamped in the fixture as shown in FIG. 5. With the dimensions of the V-shaped groove 20 being 2⅛ inch wide, this permits drilling of rectangular stock up to 2⅛ wide by 1¼ inch high, square stock up to 1½ inch on bias and again permits drilling of such stock either on or off center.

From the foregoing description of the invention, it will be appreciated that the drilling fixture of the present invention permits the drilling of round or flat stock either on or off center with extremely accurate positioning of the drill bit with respect to the workpiece and with control of the direction and course of the drill bit during the drilling operation. The drilling fixture accurately and precisely locates the center of the drill guide holes with respect to the workpiece to be drilled and maintains the drill in this precise location without wandering during the drilling operation whether drilling a curved or flat surface. The drilling fixture maintains the drill bit in the vertical orientation permitting precise drilling through both sides of the workpiece. Further, it will be appreciated that the drill fixture of the present invention is very versatile but yet is simple in design, compact and less expensive to produce than prior art drill fixtures referred to above.

Thus having described the invention, what is claimed is:

1. A drilling fixture for drilling holes in a workpiece comprising, in combination, a base having a pair of generally L-shaped end legs, a pair of generally vertical side walls joining said end legs, a V-shaped groove passing through said base and extending between said end legs for receiving therein a workpiece to be drilled, and a pair of axially aligned V-shaped openings in said vertical side walls of a size smaller than said V-shaped groove for receiving therethrough a smaller size workpiece to be drilled, the longitudinal axes of said groove and said openings intersecting one another substantially at right angles, said base being mountable to a surface by means of said end legs, a cover attached to the top of said base and enclosing said groove and said openings, an indexable drill bushing mounted on the top of said cover and being rotatable about its center axis, said bushing having a series of different size drill guide holes spaced radially outwardly from said center axis on a common radius and separated circumferentially from one another, said drill guide holes being sized to receive predetermined drill bit diameters so as to allow rotation of the associated drill bits while guiding said drill bits along their longitudinal axes during a drilling operation, the circumference of said bushing having a plurality of planar faces intersecting at edges, indexing and locking means on said cover for indexing said drill bushing such that a drill guide hole is located over a spot to be drilled in said workpiece and for locking said bushing in its indexed position, one drill guide hole being situated when said bushing is indexed such that the longitudinal axis of the drill bit passing therethrough intersects substantially at right angle the point of intersection of the longitudinal axes of said V-shaped groove and said V-shaped openings to permit drilling on the centerline of the workpiece, said indexing and locking means including teeth that engage said edges of said drill bushing to precisely locate said drill bushing and positively lock it in indexed position to prevent its rotation during the drilling operation, first screw means extending through said cover for releasably securing a workpiece in said V-shaped groove, and second screw means extending through said cover for releasably securing a workpiece passing through at least one of said V-shaped openings, said first and second screw means being operable to lock a workpiece in position to be drilled independently of said drill bushing.

2. The drilling fixture of claim 1 wherein said cover further includes a cut out portion permitting the passage of said drill bits into said V-shaped groove over a 90° arcuate section of said drill bushing to permit drilling of said workpiece both on and off of center.

3. The drilling fixture of claim 1 wherein the size of said first V-shaped groove is sufficient to receive round workpieces up to 2 inches in diameter, rectangular workpieces up 2⅛ inch wide by 1¼ inch high and square workpieces up to 1½ inch on bias and wherein the size of said second V-shaped groove is sufficient to receive round workpieces up to 1 inch in diameter and square workpieces up to ¾ inch on bias.

4. The drilling fixture of claim 1 wherein said indexable drill bushing has twelve planar faces and said teeth are angularly spaced at 15° such that the bushing can be indexed on 15° increments and wherein said bushing has twelve drill guide holes sized from ⅛ inch to ½ inch in diameter by 1/32 inch increments, with the exception of 15/32 inch.

5. The drilling fixture of claim 1 further comprising V-shaped inserts receivable in said V-shaped groove, said inserts having a peg receivable in a notch in said V-shaped groove and having a plurality of steps permitting the clamping of non-cylindrical stock in said grooves.

* * * * *